(12) United States Patent
Goldfine et al.

(10) Patent No.: US 11,802,851 B2
(45) Date of Patent: Oct. 31, 2023

(54) SEGMENTED FIELD EDDY CURRENT SENSING FOR DISPERSIVE PROPERTY MEASUREMENT AND COMPLEX STRUCTURES

(71) Applicant: JENTEK Sensors, Inc., Marlborough, MA (US)

(72) Inventors: Neil J. Goldfine, Cocoa Beach, FL (US); Andrew P. Washabaugh, Chula Vista, CA (US); Todd M. Dunford, Amherst, MA (US); Zachary M. Thomas, Pittsburgh, PA (US)

(73) Assignee: JENTEK Sensors, Inc., Marlborough, MA (US)

( * ) Notice: Subject to any disclaimer, the term of this patent is extended or adjusted under 35 U.S.C. 154(b) by 0 days.

(21) Appl. No.: 17/652,993

(22) Filed: Mar. 1, 2022

(65) Prior Publication Data

US 2023/0095662 A1 Mar. 30, 2023

Related U.S. Application Data

(63) Continuation of application No. 16/445,166, filed on Jun. 18, 2019, now Pat. No. 11,268,931.

(Continued)

(51) Int. Cl.
| | |
|---|---|
| *G01N 27/90* | (2021.01) |
| *G01N 27/72* | (2006.01) |
| *B33Y 50/00* | (2015.01) |
| *B29C 64/386* | (2017.01) |
| *B22F 10/14* | (2021.01) |
| *B22F 10/28* | (2021.01) |
| *B22F 12/90* | (2021.01) |

(Continued)

(52) U.S. Cl.
CPC ......... *G01N 27/9046* (2013.01); *B22F 10/14* (2021.01); *B22F 10/28* (2021.01); *B22F 10/37* (2021.01); *B22F 12/90* (2021.01); *B29C 64/386* (2017.08); *B33Y 50/00* (2014.12); *G01N 27/72* (2013.01); *B22F 10/20* (2021.01); *B22F 10/30* (2021.01)

(58) Field of Classification Search
CPC ...... G01N 27/72; B29C 64/386; B33Y 50/00; B22F 10/20; B22F 10/30
See application file for complete search history.

(56) References Cited

U.S. PATENT DOCUMENTS

| | | |
|---|---|---|
| 6,188,218 B1 | 2/2001 | Goldfine et al. |
| 6,486,673 B1 | 11/2002 | Goldfine et al. |

(Continued)

*Primary Examiner* — Akm Zakaria
(74) *Attorney, Agent, or Firm* — Zachary M. Thomas (57) ABSTRACT

Disclosed are method and apparatus for measuring material properties. Segmented field sensors have multiple sensing elements at different spatial geometries to capture field components having substantially different depths of penetration. These sensors are excited and measured on these different sensing elements to facilitate characterization of unknown material properties. This is illustrated in some embodiments using eddy current sensors to characterize materials that are frequency dispersive and/or do not produce a measurable phase shifts. Only a single scalar quantity may provide independent information from one or more of the sensing elements. Property estimation techniques, such as those using precomputed databases of sensor responses are used to estimate the unknown material properties.

26 Claims, 6 Drawing Sheets

Related U.S. Application Data (60) Provisional application No. 62/847,398, filed on May 14, 2019, provisional application No. 62/686,261, filed on Jun. 18, 2018.

(51) Int. Cl.
  B22F 10/37 (2021.01)
  B22F 10/20 (2021.01)
  B22F 10/30 (2021.01)

(56) References Cited

U.S. PATENT DOCUMENTS

| | | | |
|---|---|---|---|
| 6,952,095 B1 | 10/2005 | Goldfine et al. | |
| 7,280,940 B2 | 10/2007 | Goldfine et al. | |
| 7,385,392 B2 | 6/2008 | Schlicker et al. | |
| 7,411,390 B2 | 8/2008 | Goldfine et al. | |
| 7,451,657 B2 | 11/2008 | Goldfine et al. | |
| 7,467,057 B2 | 12/2008 | Goldfine et al. | |
| 7,518,360 B2 | 4/2009 | Goldfine et al. | |
| 7,589,526 B2 | 9/2009 | Goldfine et al. | |
| 7,994,781 B2 | 8/2011 | Goldfine et al. | |
| 9,207,131 B2 | 12/2015 | Schlicker et al. | |
| 10,001,457 B2 | 6/2018 | Goldfine et al. | |
| 2006/0009923 A1* | 1/2006 | Shay | G01N 27/82 702/38 |
| 2006/0076952 A9 | 4/2006 | Goldfine et al. | |
| 2007/0029997 A1* | 2/2007 | Goldfine | G01N 27/9046 324/240 |
| 2015/0233767 A1* | 8/2015 | Cedilnik | G01K 11/32 250/341.1 |
| 2017/0239720 A1* | 8/2017 | Levin | B33Y 40/10 |
| 2017/0304894 A1* | 10/2017 | Buller | B22F 12/45 |
| 2018/0120260 A1 | 5/2018 | Goldfine et al. | |
| 2018/0264590 A1 | 9/2018 | Goldfine et al. | |
| 2020/0150087 A1* | 5/2020 | Meile | B22F 12/90 |

* cited by examiner

SEGMENTED FIELD EDDY CURRENT SENSING FOR DISPERSIVE PROPERTY MEASUREMENT AND COMPLEX STRUCTURES

RELATED APPLICATION

The present application is a continuation of allowed U.S. patent application Ser. No. 16/445,166, filed Jun. 18, 2019, which claims the benefit of U.S. provisional patent application, U.S. Ser. No. 62/686,261, filed Jun. 18, 2018, and U.S. provisional patent application, U.S. Ser. No. 62/847,398, filed May 14, 2019 which are herein incorporated by reference in their entirety.

BACKGROUND

The technical field of this invention is nondestructive materials characterization including quantitative, model-based characterization of surface, near-surface, and bulk material condition for flat and curved parts or components. Characterization of material condition includes nondestructive testing/evaluation/inspection, contact and non-contact, in a stationary or scanning/motion format of (1) metal and non-metal powders used in additive manufacturing processes including but not limited to powder bed laser sintering and binder jet based processes and other powder based metallurgical processes, (2) powder layers on top of previously processed layers of material including sintered metal, and binder jet processed layers, and (3) other metals and non-metals that have effective electrical bulk or layer properties that vary with frequency of an applied electric or magnetic field. This also includes post process inspection, pre-process characterization of materials, and in-process characterization before and after incremental processing steps and during processing. Processes other than additive manufacturing that use powders such as thermal spray coating, cold spray, and other processes that use materials or produce products that may have dispersive (frequency dependent) effective properties are also included. Materials include metals, plastics, composites, ceramics, and functional materials used in coatings and multi-material parts.

Uses of characterization results can include assessment of quality or other condition of interest including geometry, surface condition, residual stress, porosity, and material properties such as yield strength, magnetic properties, thermal properties. Nondestructive characterization may also include estimation of temperature, proximity or other such parameters useful for process assessment, process control, or process quality verification. Characterization of surface and near-surface conditions includes measurements of surface roughness, displacement or changes in relative position, coating thickness, temperature and coating condition. Each of these includes detection of electromagnetic property changes associated with either microstructural and/or compositional changes, or electronic structure (e.g., Fermi surface) or magnetic structure (e.g., domain orientation) changes, or with single or multiple cracks, cracks or stress variations in magnitude, orientation or distribution.

A common technique for material characterization is eddy-current testing. Conventional eddy-current sensing involves the excitation of a conductive drive (primary) winding with an electric current source of prescribed frequency. This produces a time-varying magnetic field, which in turn is detected with a sensing (secondary) winding. The spatial distribution of the magnetic field and the field measured by the secondary is influenced by the proximity and physical properties (electrical conductivity and magnetic permeability) of nearby materials. When the sensor is intentionally placed in close proximity to a test material, the physical properties of the material can be deduced from measurements of the impedance between the primary and secondary windings. In some cases, only the self-impedance of the primary winding is measured. Traditionally, scanning of eddy-current sensors across the material surface is used to measure material properties. Another approach is to mount the sensor at a fixed location and periodically record the sensor response. The measured material properties may be of interest in their own right or may be used to further deduce the presence of features such as cracks, corrosion, and porosity. In addition to single and multiple frequency methods for eddy current testing using magnetic fields, some implementations use pulsed eddy current methods. The pulsed eddy current methods typically measure the temporal transient response associated with a step change in excitation signal. Through mathematical analysis, such as Fourier transforms or Fouries series, this type of response can be represented as a signal superimposing many excitation frequencies simultaneously. Eddy current testing is sometimes referred to as a magnetoquasistatic process, where the sensor is operated at low enough frequencies that the wavelength of traveling waves at the operating frequencies is long compared to the characteristic dimensions of interest. The technical field of this invention also includes electroquasistatic sensing using electric fields instead of magnetic fields for characterization of relatively low conductivity materials such as plastics, epoxies, ceramics, glass, and powders used for additive manufacturing of non-metallic parts.

Prior work at JENTEK Sensors, Inc. has produced numerous innovations in eddy current sensing. Examples include U.S. Pat. No. 6,952,095 which provides sensors, systems and methods for monitoring damage near a fastener; U.S. Pat. No. 7,411,390 which provides sensors, systems and methods for detecting unexploded ordinances (UXOs); U.S. Pat. No. 7,451,657 which provide sensors, systems and methods for measuring the stress in a material; and U.S. Pat. No. 7,518,360 which describes sensors, systems and methods for detecting hidden or buried flaws.

Figure 7:
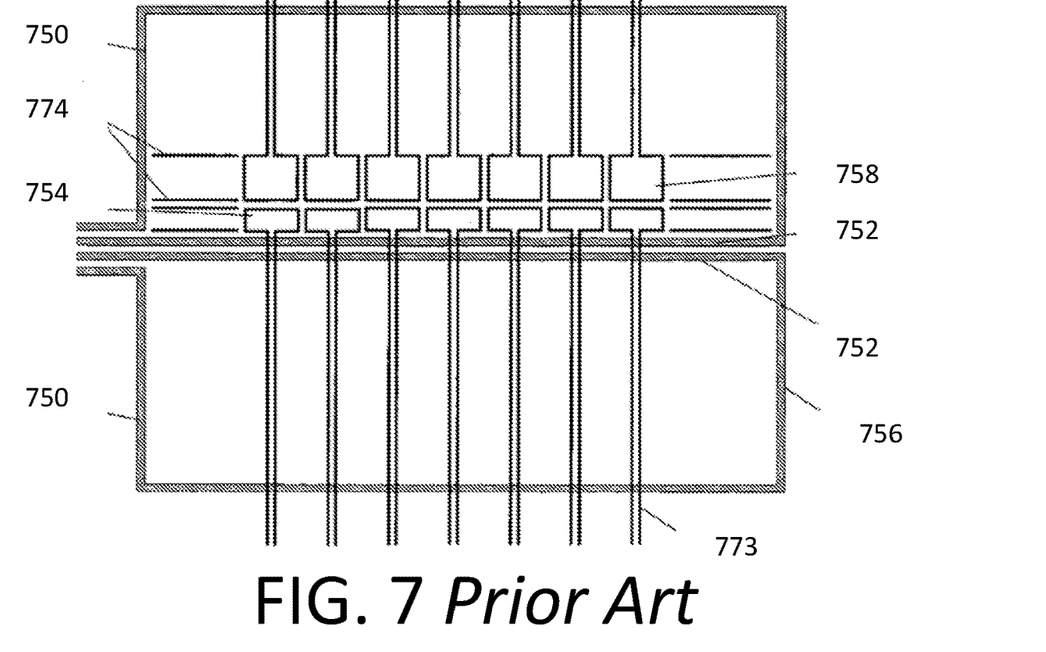
FIG. 7 is a cartesian segmented field sensor disclosed in the prior art.

U.S. published application 2006/0076952 describes "segmented field sensors" which provide information at multiple spatial wavelengths. Such sensors have sense windings at different distances to the drive winding as shown by the example in FIG. 7. This array includes rectangular loops 750 that serve as drive windings and create a magnetic field when driven by an electric current. The loops have extended portions 752 and a plurality of secondary elements 754 which, in this case, are parallel to the extended portions 752. The secondary elements 754 sense the response of the material under test (MUT) to the imposed magnetic field. A time-varying current is applied to the primary winding, which creates a magnetic field that penetrates into the MUT and induces a voltage at the terminals of the secondary elements. This terminal voltage reflects the properties of the MUT. The secondary elements are pulled back from the connecting portions of the primary winding 756 to minimize end effect coupling of the magnetic field. However, the sense elements can be brought close to the connecting portions 756 if space is limited for the inspection. Dummy elements 774 can be placed between the meanders of the primary to maintain the symmetry or uniformity of the magnetic field, as described in U.S. Pat. No. 6,188,218. The segmented field sensor in application 2006/0076952 is "particularly useful for the detection of subsurface damage or the characterization of geometric features such as inclusions or cracks.

Inspection examples include the detection and characterization of cracks under fastener heads or in lower skin layers and corrosion under paint or fastener heads."

Figure 8:
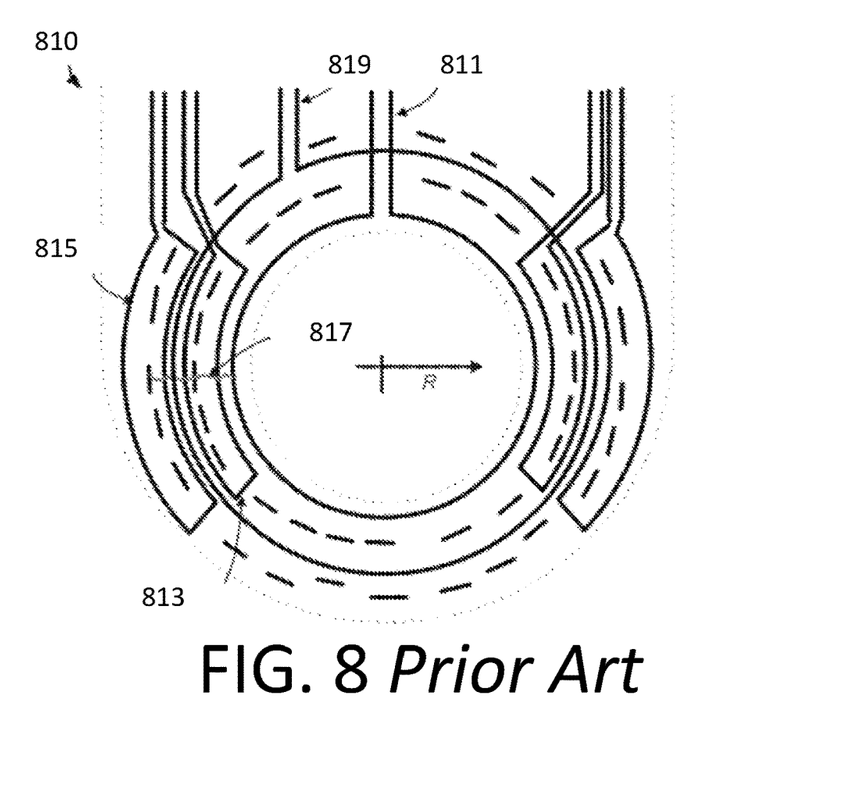
FIG. 8 is a circular segmented field sensor disclosed in the prior art.

Another example, of a segmented field sensor is a circular rosette segmented field sensor such as that shown in U.S. Pat. No. 7,994,781 (see FIG. 24a) and U.S. Pat. No. 10,001,457 (see FIG. 7B). The latter figure is reproduced here as FIG. 8 and shows an eddy current sensor 810, with drive windings 811 and 819, and sense elements 813 and 815 to detect damage 717. Note that sense elements 813 and 815 are at different radii.

SUMMARY

Some material characterization applications involve materials which do not permit conventional techniques for obtaining independent information about the material to be used. For example, it may be difficult to estimate a material property using multi-frequency techniques when the material under test is dispersive. As another example, the eddy current sensor response of a single spatial wavelength sensing element to a magnetic, non-conducting material varies in on direction in the complex transimpedance space making it impractical to distinguish from such a measurement alone the proximity of the sensor to the material and the magnetic permeability. Approaches are provided for the practical characterization of such materials and other types of material of interest.

One aspect relates to a method of measuring material properties, the method comprising acts of placing a segmented field sensor proximal to a material under test, the segmented field sensor having a first sensing element at a first spatial wavelength and a second sensing element at a second spatial wavelength; exciting the segmented field sensor with an excitation signal having a first frequency; first measuring a first response of the first sense element due to the excitation signal, the first response being a single scalar quantity; second measuring a second response of the second sense element due to the excitation signal; and estimating proximity and a second property of the material under test from the first and second responses and no other substantially simultaneous response of the first sensing element due to the excitation signal at the first frequency that is independent of the first response.

In some embodiments the single scalar quantity is selected from the group consisting of a real part of the transimpedance, an imaginary part of the transimpedance, a magnitude of the transimpedance, a phase of the transimpedance, a real part of the transadmittance, an imaginary part of the transadmittance, and a magnitude of the transadmittance a phase of the transadmittance.

In some embodiments the material under test comprises a first metal powder layer and a background material having known properties, and the second property is an effective permeability of the first metal powder layer.

In some embodiments method is part of an additive manufacturing process and the method further comprises processing at least a portion of the first metal powder layer; depositing a second metal powder on the first metal powder layer; and repeating the acts of exciting, first measuring, second measuring, and estimating with the first metal powder layer treated as part of the background material having known properties and the repeated estimating determines an effective permeability of the second metal powder layer. The act of processing may be a process selected from the group consisting of binder jet processing and laser sintering.

Another aspect relates to a system for characterizing a material under test, the system comprising a segmented field sensor having a drive element, a first sensing element at a first spatial wavelength, and a second sensing element at a second spatial wavelength; a drive circuit configured to generate an excitation signal having a first frequency and to connect to the drive element of the segmented field sensor; an instrument with first and second measurement channels configured to connect to the first and second sensing elements, respectively, of the segmented field sensor and to measure a first response and a second response of the elements, respectively, the first response being a single scalar quantity; and an estimation module configured to estimate a proximity of the segmented field sensor to a material under test and a second property of the test object from the first and second responses and no other substantially simultaneous response of the first sensing element due to the excitation signal at the first frequency that is independent of the first response.

In some embodiments of the system the first measurement channel is configured to measure a real part and an imaginary part of the transimpedance of the first sensing element, and the first response is computed from the real part and the imaginary part of the transimpedance. The first response may be the real part of the transimpedance (or transadmittance), the imaginary part of the transimpedance (or transadmittance). The first response may also be the magnitude of the transimpedance computed from the real part and the imaginary part of the transimpedance.

In some embodiments, the system further comprises a storage module for storing a database for mapping sensor responses to proximity and the second property, and wherein the estimation module is configured to process the first and second responses through the map to estimate the proximity and the second property.

In some embodiments of the system the material under test comprises a first layer and a background material, the system further comprising a storage module to store properties of the background material, and wherein the estimation module is configured to additionally use the stored properties to estimate the proximity and the second property, the second property being a property of the first layer.

In some embodiments of the system the segmented field sensor is selected from the group consisting of a circular geometry segmented field sensor and a cartesian geometry segmented field sensor.

In some embodiments the material under test includes a material of interest and a background material, the method further comprising, simultaneous with the act of first measuring the first response, measuring a third response, wherein a phase angle defined from the first response and third response is within 5 degrees of a background phase angle, the background phase angle defined as the phase angle that would be measured from the first sense element if the material of interest were removed from the material under test. Though, in some embodiments the phase angle is within 1 degree of the background phase angle.

Yet another aspect relates to a method of measuring material properties, the method comprising acts of providing a material under test comprising a material of interest and a background material; placing a segmented field sensor proximal to a material under test, the segmented field sensor having a first sensing element at a first spatial wavelength and a second sensing element at a second spatial wavelength; exciting the segmented field sensor with an excitation signal having a first frequency; measuring a first response of the first sense winding due to the excitation signal, the first response having a phase shift of less than 5 degrees relative to a response to the background material alone; measuring a second response of the second sense winding due to the excitation signal; and estimating proximity and a second property of the material under test from the first and second responses.

In some embodiments the estimating of the proximity and the second property uses a parameter proportional to a magnitude of the first response and the estimating is independent of the phase of the first response.

In some embodiments the estimating of the proximity and the second property, the first and second responses are scalar quantities.

In some embodiments the segmented field sensor has a drive electrode, the material under test has a material of interest with an electrical conductivity of less than 0.001 S/m, the act of exciting the segmented field sensor comprises applying a voltage to the drive electrode, and the act of estimating the second property comprises estimating a component of a complex permittivity of the material of interest. The component of the complex permittivity of the material of interest may be selected from the group composed of a dielectric constant and a ratio of a conductivity and the first excitation frequency.

In some embodiments, the second property is surface roughness.

In some embodiments the method further comprises an act of identifying from the second property a defect in the material under test.

In some embodiments the material under test includes a metal powder and the second property is an effective permeability of the metal powder.

In some embodiments, the material under test is a metal powder, the metal powder comprises a plurality of layers and the second property is an effective permeability of a layer among the plurality of layers most proximal to the segmented field sensor.

In some embodiments the method further comprises an act of identifying from the second property a local anomaly in the material under test. The local may be a density change in the material under test, a clump in the material under test, a void in the material under test, or another type of local anomaly.

In some embodiments the method further comprises moving the sensor based on the proximity.

In some embodiments a precomputed database and a multivariate inverse method are used in estimating the at least one property from the first and second responses.

In some embodiments the second property is an effective bulk complex permeability.

In some embodiments the proximity and the second property are estimated solely from the magnitude responses of the first and second sensing elements and a solution would not be obtainable from one sensing element alone.

In some embodiments the material under test is a functional coating.

In some embodiments the material under test is a carbon fiber reinforced composite.

In some embodiments exciting the segmented field sensor comprises providing a current on a conductive winding, the conductive winding having a substantially circular segment that is concentric with a first arced segment of the first sense winding and concentric with a second arced segment of the second sense winding, and the first and second arced segments have different average radii.

In some embodiments exciting the segmented field sensor comprises providing a current on a conductive winding, the conductive winding having a substantially rectangular segment.

In some embodiments the acts are repeated for a plurality of frequencies.

In some embodiments the material under test comprises a metal powder, the second property is an electrical property of the powder, and the method further comprises an act of estimating the density of the metal powder from the electrical property. The electrical property may be permeability, for example. The density may be estimated from the second property using a regression equation.

In some embodiments the proximity is used to estimate surface roughness. Another aspect relates to a method of measuring material properties, the method comprising acts of placing a segmented field sensor proximal to a material under test, the segmented field sensor having a first sensing element at a first spatial wavelength and a second sensing element at a second spatial wavelength; exciting the segmented field sensor with an excitation signal having a first frequency; measuring a first response of the first sense winding due to the excitation signal;

measuring a second response of the second sense winding due to the excitation signal; and estimating proximity and a second property of the material under test from the magnitudes and phases of the first and second responses, wherein the first frequency is high enough that a phase of the first response relative to air is correlated with the proximity or the second property.

In some embodiments the material under test is a conducting powder and a skin depth is less than two times a particle dimension. In some embodiments the conducting powder is a powder used in additive manufacturing processes.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Some materials, such as composites, metal powders, non-metal powders, and special coatings are challenging to characterize non-destructively. Non-destructive testing (NDT) techniques must be adapted and improved to measure properties of these materials and proximity to these materials. The properties of interest vary by material type but can also include, for example, surface roughness, the presence and location of surface or buried defects (e.g., cracks, delamination, porosity, clumps, voids, foreign objects/debris), and density, to name but a few. Characterizing a material with an eddy current sensor requires at least the number of independent measurements as there are independent material properties to be directly estimated. For example, to measure (or estimate) the magnetic permeability and lift-off (proximity) for a metal powder being inspected with an eddy current sensor, at least two independent measurements must be provided. Using precomputed databases of sensor responses such as those described in U.S. Pat. Nos. 5,453,689 and 7,467,057 multiple unknown geometric and electrical (e.g., layer thickness, lift-off, permeability, conductivity) properties of a material can be estimated from eddy current sensor impedance measurements. Various empirical, statistical and analytical techniques can be used to estimate additional properties (e.g., the presence of a crack). As indicated by Goldfine et al. in U.S. Pat. No. 6,188,218, these "measurement algorithms permit the integration of impedance measurement data at multiple frequencies, multiple winding spatial wavelengths, and multiple lift-offs."

Using eddy current sensors to characterize materials that are frequency dispersive and/or do not produce a measurable phase shift limits the effectiveness of using multiple frequencies to measure material properties. In this circumstance the phase shift is measured relative to the phase shift that occurs if the material of interest were replaced by a suitable reference material; typically this material is air. Metal additive manufacturing powders are an example of a material that may have frequency dispersive properties or produce little or no measurable phase shift, depending upon the intrinsic material properties, dimensions of the powder particles, and the excitation frequency. For example, if the conventional skin depth for the magnetic field within the particle is much larger than the diameter of the particle substantial eddy currents will not be excited within the particle and any signal phase shift associated with these induced eddy currents will be correspondingly small. However, when the skin depth is small compared to the particle diameter the phase shifts can be large and vary with the excitation frequency. Note that the conventional skin depth is proportional to the reciprocal of the square root of the product of the angular frequency, the magnetic permeability and the electrical conductivity of a material. For a composite material, such as a powder bed (powder particles surrounded by air) or particles embedded within a resin, the skin depths are different for each of the constituent materials and the composite, for which the effective permeability and conductivity would be geometric weighted averages of the respective properties of the constituents. For estimating the phase contributions of the particles, the skin depth within the particle is considered. If such a layer of an additive manufacturing powder (the material of interest) is placed on top of a previously processed material, where the previously processed material may have effectively non-dispersive properties (i.e. properties that do not vary with frequency) while the powder has properties that vary with frequency, then multiple excitation frequencies will not be suitable for obtaining information about the material condition and the lift-off or sensor proximity to the material surface.

Equally challenging is the assessment of materials that have dispersive properties. These are materials that when interrogated with a magnetic or electric field do not produce a significant phase shift relative to the response without the layer of interest present (or for which one of the components of the complex impedance response does not change relative to the responses with the layer of interest replaced by air). For clarity consider two examples, both of which consider a powder bed with a new layer of powder placed on top of a material that was processed either by laser sintering or by binder jet fusion. For the first example, for the sintered material the sensor response will produce a complex impedance where both the real and imaginary parts (or magnitude and phase) vary relative to the response in air. However, when the layer of powder is added, independent information about the powder properties at some frequencies may not be available in both the real and imaginary part of the complex impedance (or in both the magnitude and phase). As an example, this applies if the skin depth for the field within the particle is very large compared to the particle diameter, such as 20 times larger than the particle diameter. Thus, for this first example, it is not practical to measure the powder properties. Some embodiments address this situation through the use of multiple sensing elements at different distances from a drive conductor to provide independent information at a single excitation frequency. The information obtained from each sense element provides additional independent information that allows for practical estimation of proximity and powder layer properties. In the second example, the bulk properties of a powder are measured. For one such example, the properties of interest are the magnetic permeability and proximity. For this two unknown problem (lift-off, magnetic permeability), two independent measurements are needed; these two independent measurements provide two independent equations so that enough information is available to solve for the two unknowns. In this example, the change in the response sensor impedance is only for one measurement parameter, such as the magnitude of the response and not in the phase (relative to the response in air), or it is only in one of the complex impedance components (real or imaginary). Then a practical method to assess this material is to use two or more sensors with different drive winding or sensing element configurations.

Figure 4:
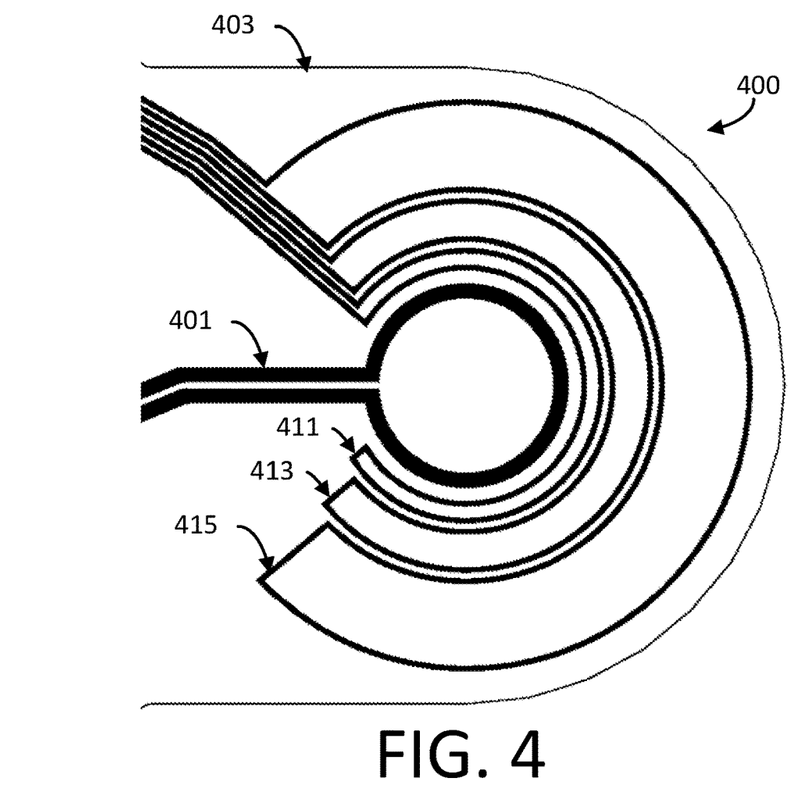
FIG. 4 is a circular segmented field sensor according to some embodiments.

A key element of the methods that use multiple sensors or sense element configurations with a single drive windings is the measurement of the response of sensing fields that penetrate to different depths within the material being examined. One such embodiment is a circular eddy current sensor with a circular drive and two sensing elements at different radial distances from the drive; an example of such a sensor is sensor 400 shown in FIG. 4. Sensor 400 has a drive element 401, a first sensing element 411, a second sensing element 413, and a third sensing element 415 microfabricated on an insulating substrate 403. Although not shown, electrical connections to the drive and sensing elements are provided to facilitate measurement by suitable instrumentation such as instrument 110, shown in FIG. 1. Another embodiment is a rectangular drive with two or more sensing elements at different drive-sense gaps from one of the longer rectangular drive conductors (see FIG. 7 for an example of such a sensor). In both of these embodiments these sensors have sensing elements located distinct distances from the drive windings. Since the sensing elements are at distinct distances from the drive winding, they are sensitive to different components of the magnetic field which penetrate to different depths within the test material. A third embodiment is to use two differently sized drive windings so that each has a different distance from a single sense element. By exciting the drive windings sequentially or at two different excitation frequencies where the signal contribution from each frequency can be isolated, it is possible to obtain independent information about the two properties of interest (e.g., permeability and lift-off).

Figure 2:
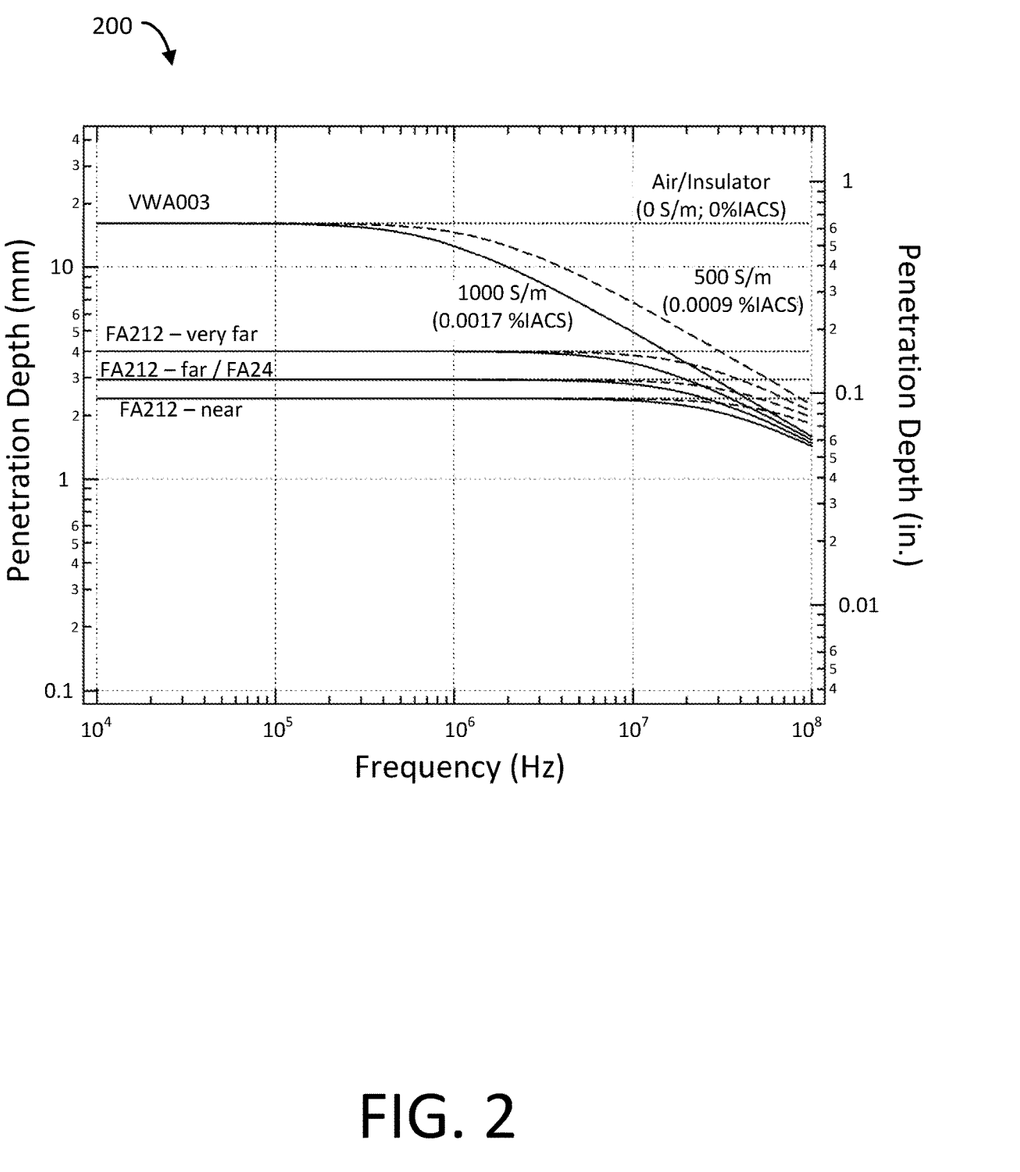
FIG. 2 is a plot of depth of penetration for example sensors.

As mentioned above, the sensors or sensor arrays are utilized in a fashion that allows independent measurement of components of the magnetic field that penetrate to different depths within the material of interest. The depth of penetration of the magnetic field into the test material depends upon both the input current frequency and the sensor geometry (drive winding dimensions or spatial wavelength). This can be observed from an analysis of the equations for the physical response of the sensor or illustrations such as the depth of penetration chart 200 shown in FIG. 2 for several sensor constructs and several material electrical conductivities. At low frequencies, the depth of penetration is limited by the geometry of the sensor (i.e., spatial wavelength), while at high frequencies it is limited by the conventional skin depth, which decreases as the frequency and electrical conductivity increase. At low frequencies, the magnetic fields from a larger spatial wavelength sensor will penetrate further into the MUT than the fields from a shorter spatial wavelength sensor. In this example, the VWA003 eddy current sensor has a single rectangular drive winding and a relatively large drive-sense gap that leads to a nominal spatial wavelength of approximately 10.16 cm (4.00 in.). In contrast, the FA212 eddy current sensor has two rectangular drive windings placed adjacent to each other and several sensing elements that are "near" the central part of the drive winding, in a "far" position, or "very-far" from the central part of the drive winding. The effective spatial wavelengths are approximately 0.59 in., 0.73 in., and 0.99 in. for the near, far, and very-far sensing elements, respectively.

Measurements at multiple lift-offs can also provide added information for estimating multiple properties. However, this is usually not practical for in-process measurements and can be tedious, particularly if the lift-off must be well controlled. The inventors have thus recognized and appreciated the primacy of using multiple spatial wavelength measurements, and particularly segmented field sensors to characterize such materials. Here multiple spatial wavelength measurements refer to the use of multiple sensor-drive constructs that allow components of the magnetic field (or electric field for capacitive sensing) that penetrate to different depths within the test material to be sensed. For example, if one were to use a Fourier series representation of the spatial shape of the sensing field distribution, a longer dominant spatial wavelength component would be obtained when the distance is larger between the drive conductor (the longer segment of the drive rectangle) and the sensing element; this longer spatial wavelength corresponds to deeper penetration depths into the test material. The origins of the use of the spatial wavelength description is the earlier work by the inventors using spatially periodic sensors. The preferred sensor formats are no longer periodic for many applications, so the spatial wavelength now refers to the spatial wavelength of the longest dominant component of a spatial frequency domain representation of the applied field that is sensed by the sensing element. Segmented field sensors are thus defined as sensors that have two or more unique sensor-drive configurations that allow sensing of different effective spatial components or segments of the applied field. This provides independent information that can be used to measure multiple properties of interest such as proximity and magnetic permeability. Novel methods and apparatus are disclosed for characterizing materials using segmented field sensors, though the invention is not so limited.

Figure 1:
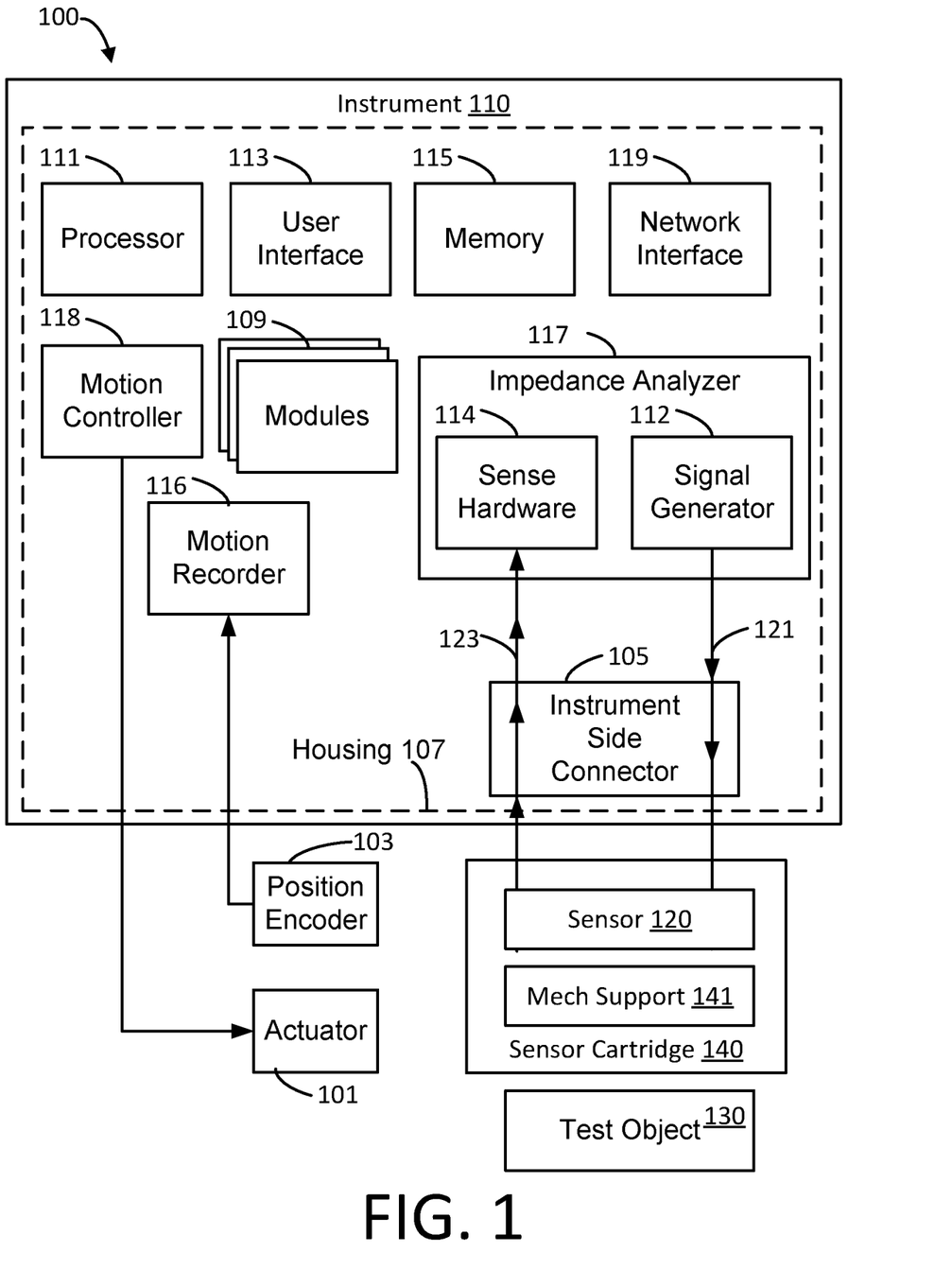
FIG. 1 is a block diagram a system for inspecting a test object according to some embodiments.

FIG. 1 is a block diagram of a system 100 for inspecting a test object 130. System 100 includes an instrument 110 and a sensor cartridge 140. Instrument 110 may be housed in a housing 107; in some embodiments the housing is substantially cylindrical in shape. Sensor cartridge 140 may have a rigid connector which interfaces both mechanically and electrically with an instrument side connector 105. Advantageously in some embodiments both the electrical and mechanical connections of sensor cartridge 140 engage simultaneously with instrument side connector 105. In some other embodiments, sensor cartridge is functionally connected to instrument side connector 105 through a cable. Sensor cartridge 140 in some embodiments also includes a flexible sensor 120, and a mechanical support 141 to which the sensor is attached. Sensor 120 may be attached to mechanical support 141 with glue, tape, double sided tape, or in any suitable way. Instrument 110 is configured to provide excitation signals 121 to sensor 120 and measure the resulting response signals 123 of sensor 120. Response signals 123 may be measured and processed to estimate properties of interest, such as electromagnetic properties (e.g., electrical conductivity, permeability, and permittivity), geometric properties (e.g., layer thickness, sensor liftoff), material condition (e.g., fault/no fault, crack size, layer to layer bond integrity, porosity, residual stress level, temperature), or any other suitable property or combination thereof including properties of the fabricated part and the powder. (Sensor liftoff is a distance between the sensor and the closest surface of the test object for which the sensor is sensitive to the test object's electrical properties.)

Instrument 110 may include a processor 111, a user interface 113, memory 115, an impedance analyzer 117, and a network interface 119. Though, in some embodiments of instrument 110 may include other combinations of components. While instrument 110 is drawn with housing 107, it should be appreciated that instrument 110 may be physically realized as a single mechanical enclosure; multiple, operably-connected mechanical enclosures, or in any other suitable way. For example, in some embodiments it may be desired to provide certain components of instrument 110 as proximal to sensor 120 as practical, while other components of instrument 110 may be located at greater distance from sensor 120.

Processor 111 may be configured to control instrument 110 and may be operatively connected to memory 115. Processor 111 may be any suitable processing device such as for example and not limitation, a central processing unit (CPU), digital signal processor (DSP), controller, addressable controller, general or special purpose microprocessor, microcontroller, addressable microprocessor, programmable processor, programmable controller, dedicated processor, dedicated controller, or any suitable processing device. In some embodiments, processor 111 comprises one or more processors, for example, processor 111 may have multiple cores and/or be comprised of multiple microchips. Processing of sensor data and other computations such as for control may be performed sequentially, in parallel, or by some other method or combination of methods.

Memory 115 may be integrated into processor 111 and/or may include "off-chip" memory that may be accessible to processor 111, for example, via a memory bus (not shown). Memory 115 may store software modules that when executed by processor 111 perform desired functions. Memory 115 may be any suitable type of non-transient computer-readable storage medium such as, for example and not limitation, RAM, a nanotechnology-based memory, optical disks, volatile and non-volatile memory devices, magnetic tapes, flash memories, hard disk drive, circuit configurations in Field Programmable Gate Arrays (FPGA), or other semiconductor devices, or other tangible, non-transient computer storage medium.

Instrument 110 may have one or more functional modules 109. Modules 109 may operate to perform specific functions such as processing and analyzing data. Modules 109 may be implemented in hardware, software, or any suitable combination thereof. Memory 115 of instrument 110 may store computer-executable software modules that contain computer-executable instructions. For example, one or more of modules 109 may be stored as computer-executable code in memory 115. These modules may be read for execution by processor 111. Though, this is just an illustrative embodiment and other storage locations and execution means are possible.

Instrument 110 provides excitation signals for sensor 120 and measures the response signal from sensor 120 using impedance analyzer 117. Impedance analyzer 117 may contain a signal generator 112 for providing the excitation signal to sensor 120. Signal generator 112 may provide a suitable voltage and/or current waveform for driving sensor 120. For example, signal generator 112 may provide a sinusoidal signal at one or more selected frequencies, a pulse, a ramp, or any other suitable waveform. Signal generator may provide digital or analog signals and include conversion from one mode to another.

Sense hardware 114 may comprise multiple sensing channels for processing multiple sensing element responses in parallel. As there is generally a one to one correspondence between sense elements and instrumentation channels these terms may be used interchangeably. It should be appreciated that care should be used, for example, when multiplexing is used to allow a single channel to measure multiple sense elements. For sensors with a single drive and multiple sensing elements such as the MWM-Array the sensing element response may be measured simultaneously at one or multiple frequencies including simultaneous measurement of real and imaginary parts of the transimpedance. Though, other configurations may be used. For example, sense hardware 114 may comprise multiplexing hardware to facilitate serial processing of the response of multiple sensing elements and for eddy current arrays other than MWM-Arrays multiplexing may be used for combinations of sensing elements and drive elements. Some embodiments use MWM-Array formats to take advantage of the linear drive and the ability to maintain a consistent eddy current pattern across the part using such a linear drive. Sense hardware 114 may measure sensor transimpedance for one or more excitation signals at on one or more sense elements of sensor 120. It should be appreciated that while transimpedance (sometimes referred to simply as impedance), may be referred to as the sensor response, the way the sensor response is represented is not critical and any suitable representation may be used. In some embodiments, the output of sense hardware 114 is stored along with temporal information (e.g., a time stamp) to allow for later temporal correlation of the data, and positional data correlation to associate the sensor response with a particular location on test object 130. Instrumentation may also operate in a pulsed mode with time gates used to provide multiple sensing outputs and multiple channels used to acquire data from multiple sensing elements. If these sensing elements have different drive-sense gaps (distance between a drive conductor (or electrode) and the sensing winding (or electrode), then this is referred to as a segmented field sensor. Thus, sensor operation can be at a single frequency, multiple frequencies, or in a pulsed mode where the drive is turned on and off in a prescribed manner or switched between two or more modes of excitation.

Sensor 120 is an eddy-current sensor; though in some other embodiments it may be a dielectrometry sensor, thermography method, or utilize any other suitable sensing technology or combination of sensing technologies. In some embodiments sensor 120 provides temperature measurement, voltage amplitude measurement, stain sensing or other suitable sensing modalities or combination of sensing modalities. In some embodiments, sensor 120 is an eddy-current sensor such as an MWM®, MWM-Rosette, or MWM-Array sensor available from JENTEK Sensors, Inc., Marlborough, Mass. Sensor 120 may be a magnetic field sensor or sensor array such as a magnetoresistive sensor (e.g., MIR-MWM-Array sensor available from JENTEK Sensors, Inc.), a segmented field MWM sensor, and the like. In some embodiments sensor 120 is an interdigitated dielectrometry sensor or a segmented field dielectrometry sensor such as the IDED® sensors also available from JENTEK Sensors, Inc. Segmented field sensors have sensing elements at different distances from the drive winding or drive electrode to enable interrogation of a material to different depths at the same drive input frequency. Sensor 120 may have a single or multiple sensing and drive elements. Sensor 120 may be scanned across, mounted on, or embedded into test object 130.

In some embodiments, the computer-executable software modules may include a sensor data processing module, that when executed, estimates properties of test object 130. The sensor data processing module may utilize multi-dimensional precomputed databases that relate one or more frequency transimpedance measurements to properties of test object 130 to be estimated. The sensor data processing module may take the precomputed database and sensor data and, using a multivariate inverse method, estimate material properties for the processed part or the powder. Though, the material properties may be estimated using any other analytical model, empirical model, database, look-up table, or other suitable technique or combination of techniques.

User interface 113 may include devices for interacting with a user. These devices may include, by way of example and not limitation, keypad, pointing device, camera, display, touch screen, audio input and audio output.

Network interface 119 may be any suitable combination of hardware and software configured to communicate over a network. For example, network interface 119 may be implemented as a network interface driver and a network interface card (NIC). The network interface driver may be configured to receive instructions from other components of instrument 110 to perform operations with the NIC. The NIC provides a wired and/or wireless connection to the network. The NIC is configured to generate and receive signals for communication over network. In some embodiments, instrument 110 is distributed among a plurality of networked computing devices. Each computing device may have a network interface for communicating with other the other computing devices forming instrument 110.

In some embodiments, multiple instruments 110 are used together as part of system 100. Such systems may communicate via their respective network interfaces. In some embodiments, some components are shared among the instruments. For example, a single computer may be used control all instruments. In one embodiment multiple areas on the test object are scanned using multiple sensors simultaneously or in an otherwise coordinated fashion to use multiple instruments and multiple sensor arrays with multiple integrated connectors to inspect the test object surface faster or more conveniently.

Actuator 101 may be used to position sensor cartridge 140 with respect to test object 130 and ensure that the liftoff of the sensor 120 is in a desired range relative to the test object 130. Actuator 101 may be an electric motor, pneumatic cylinder, hydraulic cylinder, or any other suitable type or combination of types of actuators for facilitating movement of sensor cartridge 140 with respect to test object 130. Actuators 101 may be controlled by motion controller 118. Motion controller 118 may control sensor cartridge 140 to move sensor 120 relative to test object 130.

Regardless of whether motion is controlled by motion controller 118 or directly by the operator, position encoder 103 and motion recorder 116 may be used to record the relative positions of sensor 120 and test object 130. This position information may be recorded with impedance measurements obtained by impedance analyzer 117 so that the impedance data may be spatially registered.

For some applications the performance of system 100 depends (among other things) on the proximity of sensor 120 to test object 130; that is to say the sensor liftoff may be critical to performance for such applications. For example, crack detection in an aerospace application may require cracks 0.5 mm (0.02 inches) in length be reliably detectable in test object 130 (e.g., a turbine disk slot). In order to achieve reliable detection of a small crack, sensor 120's liftoff may need to be kept to under 0.25 mm (0.010 inches). Further, for such an application, sensor 120 may preferably be a sensor array, thus the liftoff of each element in the array may need to be kept to under 0.25 mm (0.010 inches). (It should be appreciated that these dimensions are illustrative and the specific requirements will be dictated by the details of the application.) Measurements may be complicated when test object 130 has a complex curved surface that may change along a measurement scan path.

As stated earlier, a sensor with two effective spatial wavelengths can have a first sensing element at a first distance from a drive and second sensing element at a second distance. In one embodiment a different first and second spatial wavelength for the sensed field is achieved by locating a first sensing element at a first distance from a drive and second sensing element at a second distance from the drive. The drive may be a conductor with an applied input current; in another embodiment the drive is an electrode with an applied input voltage. The sensing elements could be inductive loops and electrodes respectively.

In some embodiments the material under test is a powder and the drive is a conductor with an applied input current at at least one prescribed frequency. In one such embodiment the powder is a metal powder with a magnetic relative permeability that is greater than 1.01 (or 1% different than the permeability of air). In one such embodiment the frequency is low enough that the skin depth (the depth of penetration for the metal in the particles defined by the skin depth equation) is more than 4 times the largest dimension of the particles. The skin depth δ can be expressed as $$\delta = \frac{1}{\sqrt{\pi f \mu \sigma}}$$

where f is the excitation frequency, μ is the magnetic permeability of the material, and σ is the electrical conductivity of the material. The magnetic permeability is often expressed relative to the permeability of free space using a coefficient called the magnetic relative permeability. While nonmagnetic materials have a relative permeability of 1, many magnetic materials have a relative permeability in the range of 3 to several hundred. As examples, the skin depth was calculated at an excitation frequency of 1 MHz for several nominal sets of material properties. For an annealed copper the electrical conductivity is 58 MS/m and the relative permeability is 1 so that the corresponding skin depth is 66 microns (0.0026 in.). For typical carbon steels, the electrical conductivity can be taken as 2.9 MS/m and the relative permeability as 50 so that the corresponding skin depth is 42 microns (0.0016 in.). For iron oxides, the relative permeability is large but the electrical conductivity is very low; using a conductivity value of 1 S/m and a relative permeability of 100 yields a skin depth of 0.05 m (2.0 in.). With a typical powder particle diameter of order 50 to 150 microns (0.002 to 0.006 in.) the skin depth in the powder material may be comparable to the dimensions of the powder or substantially larger than the dimensions of the particles. When the skin depth is substantially larger than the dimensions of the powder and if there is not substantial electrical conduction between the particles, insufficient eddy currents will be induced in the powder and the phase shift of the sensor response associated with conduction effects will be small (near zero degrees phase shift).

In such situations, in which the phase shift is near zero, the sensor could still respond to the magnetic properties of the material. This would manifest itself predominantly in one of the measurement parameters, either the in-phase portion of the measurement signal or the quadrature portion of the measurement signal. Since this only provides a single measurement value, if two properties are to be determined, such as the permeability and lift-off to the powder, then two sensors or sensor configurations that provide two measurement responses are required. In one such embodiment, the impedance is measured at two sensing elements having two distinct and different distances from the same drive conductor. In one such embodiment, one of the components of the impedance (either the real or imaginary part; or similarly either the magnitude or phase) does not change when the properties of the powder change or the proximity of the powder changes. Thus, for this embodiment only one independent measurement is provided at one applied frequency. In one such embodiment, changing the frequency does not produce additional independent information that can be used to estimate a second property. In one such embodiment, having two sensing elements at two different distances from the drive provides two independent measurements (e.g. two impedance real parts, one from each sensing element) that are then used to estimate the proximity of the sensor to the powder layer and a second property. In one such embodiment, the second property is the magnetic permeability. In some embodiments the lift-off or sensor proximity to the surface is another parameter that is measurement. Since surface roughness can lead some material regions being close to the sensor (i.e., smaller lift-off) and other regions being further from the sensor (i.e., larger lift-off), an average proximity response to the material over an area, may be used to estimate the surface roughness or local surface topology related to the condition of the powder bed surface. In one such embodiment, the second property is used to estimate the condition or quality of the powder. In particular, measurements of the effective magnetic permeability of the powder will reflect the intrinsic material properties of the powder, such as the magnetic permeability and electrical conductivity, as well as geometric properties of the powder, such as the average particle diameter and the particle volume fraction. In one such embodiment, the condition of the incremental powder layer deposit is assessed; this condition of the last layer deposited on top of a previously processed layer could reflect the quality of the layer deposition process in terms of the uniformity of the powder layer, the presence of void regions for missing powder, and the thickness of the layer. An example is illustrated in FIGS. 3A and 3B.

Figure 3A:
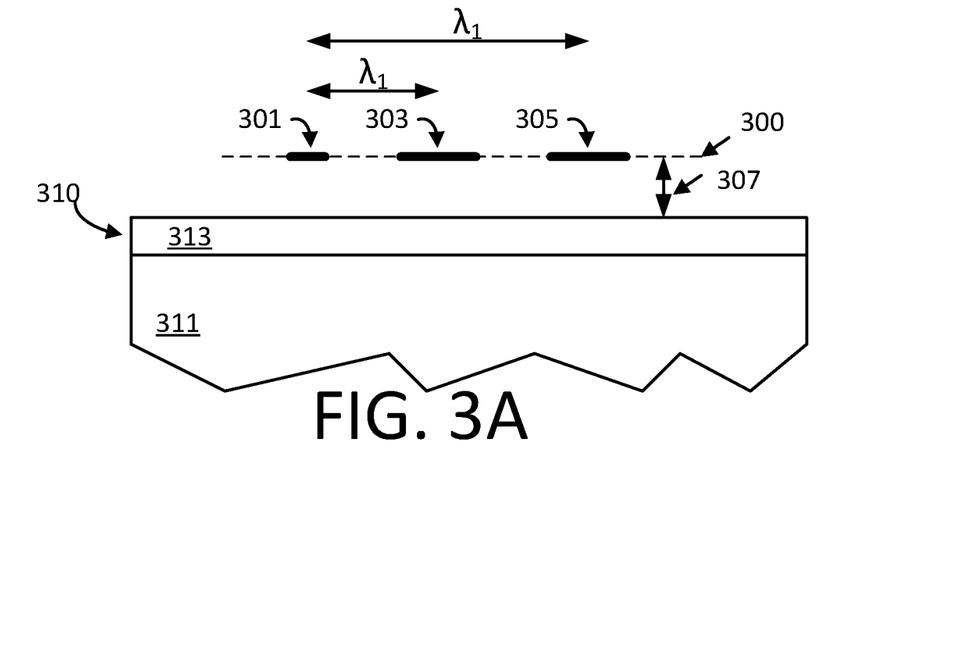
FIGS. 3A and 3B are cross-sectional views of a sensor inspecting a material under test.

In FIG. 3A, a cross-sectional view is shown of a sensor 300 and test object 310. Sensor 300 includes a drive element 301, a first sensing element 303 and a second sensing element 305. Sensor 300 is place with proximity 307 to material under test 310. Material under test 310 includes a material of interest 313 and a background material 311. The physical configuration of the relative positions of material of interest 313 and background material 311 is illustrative, and other suitable configurations may be dictated by the application. In one embodiment material of interest 313 is a powder layer deposited on background material 311. Background material 311 may have known material properties; such properties may be known from prior measurement, obtained independently or assumed. In some embodiments all relevant properties of background material 311 are known while in some other embodiments one or more properties of background material 311 are estimated from sensor measurements obtained from sensor 300. Measurements are obtained from sensing elements 303 and 305 in response to exciting drive element 301 with an excitation signal having at least a first frequency. The excitation signal may be a single sinusoidal signal at the first frequency, a pulse, a sum of sinusoidal signals, or any other suitable signal. The proximity and a property of the material under test are estimated from the measurements. In some embodiments the property of the material under test is a property of the material of interest 311.

Figure 3B:
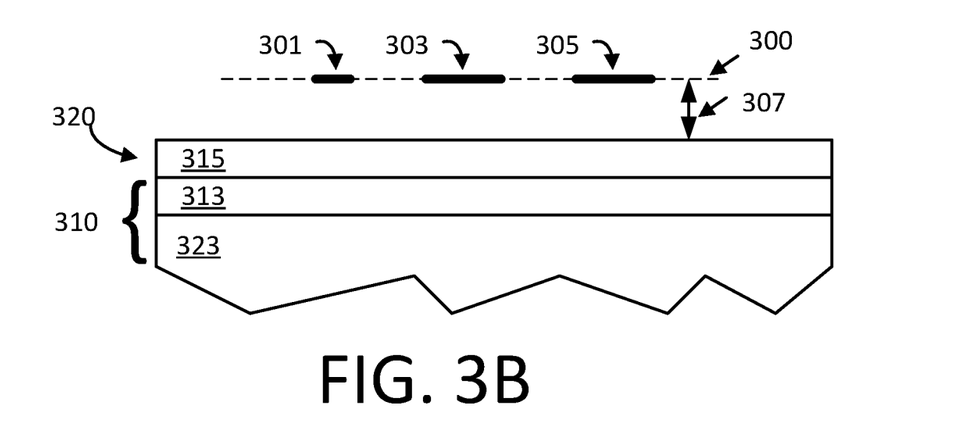

As shown in FIG. 3B an additional layer 315 may be added to produce a material under test 320. Material under test 320 includes the material under test 310 and additional layer 315. The process may be repeated to estimate a property of additional layer 315. The material under test 310 may now be treated as a background material and the results of the prior measurement may be used to reduce the number of unknown properties to be measured. For example, the permeability of layer 313 may have been estimated from measurements under the configuration shown in FIG. 3A; this permeability may be treated as known for layer 313 in the configuration of FIG. 3B.

In one embodiment, a new powder layer is placed on a powder bed and the process is laser sintering or binder jet processing. In one such embodiment, the distances between the drive conductor and the sensing elements are varied so that one element senses a field component that penetrates into the powder to a depth of penetration less than 0.8 times the depth of penetration of the field sensed by the second sensing element. Though, the relative depth of penetration of the smaller spatial wavelength sensing element may be any suitable value including greater than, less than, or equal to 0.1, 0.2, 0.3, 0.4, 0.5, 0.6, 0.7, 0.8, and 0.9, or any other suitable value. In one such embodiment, the independent measurements from the two sensing elements are used to estimate two properties. In one such embodiment, one property is the proximity of the sensor to the surface and the second property is the magnetic permeability of the material. In one such embodiment, the lift-off (or proximity) is not actually estimated but it is compensated for so that the property of the material that is estimated is essentially independent of the lift-off value.

In another embodiment, the material is a powder with a magnetic property essentially the same as air and powder particles that are electrically conducting. In one such embodiment, a segmented field sensor is operated at a frequency high enough that the skin depth of the magnetic field into the particle is less than 4 times the largest dimension of the average particle in a powder bed. Though in other embodiments, the skin depth of the magnetic field into the particle is less than 1, 2, 3, 5, 6, 7, 8, 9, 10, 20, or 25 times the largest dimension of the average particle in a powder bed. In some embodiments, the response of two or more sensing elements are used to estimate two or more properties. In one such embodiment, the properties are the proximity and two additional properties. In order to estimate additional properties associated with the powder, with air, a resin, or some other non-electrically conducting host material surrounding the powder, models of the powder particle response to the interrogating magnetic field may be exercised. A variety of these models are available to relate the properties of the particles, such as the electrical conductivity, magnetic permeability, average particle dimensions, particle shape factors or aspect ratios, and volume density fractions, to the imposed magnetic field. As an example, Inkpen and Melcher ("Smoothing the Electromagnetic Heating Pattern in Polymers," Polymer Engineering and Science, Mid-April, 1985 Vol. 25, No. 5, pp. 289-294) developed an analytical model for a collection of non-magnetic but electrically conducting spheres. This model assumed the skin depth is small compared to the radius of the spheres and neglected the effects of contacts between the spheres and the effect of interactions in the fields between the spheres. Even with these limitations, Goldfine ("Uncalibrated, Absolute Property Estimation and Measurement Optimization for Conducting and Magnetic Media Using Imposed Omega-k Magnetometry," Ph.D. thesis, Massachusetts Institute of Technology, September, 1990) showed that the frequency dependent complex susceptibility of large (2 mm diameter) aluminum spheres was consistent with the model for assumed values of the particle diameter, particle volume fraction, and electrical conductivity. Here, the multiple frequency data would be used with the model to estimate the particle properties. Other models that do not have these limiting assumptions could also be used in the analysis. Thus, in one such embodiment, a model is used to enable the estimation of the average particle diameter and the density, assuming the particle conductivity. In another such embodiment using a segmented field sensor, the proximity and density are estimated assuming the particle dimensions or particle property distributions. In one such embodiment, a laser sintering process is used, and the properties of a powder layer placed on top of a previously processed layer are estimated. In one such embodiment, the property estimates are used to detect local anomalies. In one such embodiment, the anomalies are clumps, voids, or surface roughness.

In one embodiment, properties of complex processed layers are measured where the layers contain features such as sintered material in varied geometric patterns. The use of segmented field sensing is necessary to estimate the effective bulk properties of the processed layers or bulk material. In one such embodiment, the processed material is a metal with voids for the purpose of lightening the weight and the sensor response at multiple sensing elements is used to provide independent information to assess the condition of the produced component. In one such embodiment, the condition is quality. In one such embodiment, the multiple segmented field sensing element responses are used to detect defects, layer by layer in a part with a complex patterned geometry produced using additive manufacturing.

In one embodiment a magnetic field segmented field sensor has a circular drive with two or more sensing elements outside the drive conductor at different radial positions. In another preferred embodiment a segmented field has a single rectangle drive with at least two linear rows of sensing elements at at least two different drive-sense gaps (distances between one longer linear drive conductor of the rectangular drive and the center of the linear rows of sensing elements). In one preferred embodiment a segmented field can has a dual rectangle drive with at least two linear rows of sensing elements at at least two different drive-sense gaps (distances between the center linear drive conductors of the two rectangular drives and the center of the linear rows of sensing elements). In each of the above configurations the distance between the drive conductors and the sensing elements is selected to ensure that the magnetic field penetrates sensed by a first sensing element penetrates a relatively shallow distance into a material under test and the magnetic field sensed by a second sensing element penetrates at least between 10% and 100% (e.g., 10%, 20%, 30%, 40%, 50%, 60%, 70%, 80%, 90%, 100%, 110%) further into the material under test to provide independent information. In one such embodiment the independent information is used to measure at least one property of a powder and to correct for proximity variations. In another such embodiment the proximity (also called lift-off) is estimated. In one such embodiment the liftoff is used to control the distance between the sensor and the surface of the powder. In another such embodiment the proximity is used to estimate surface roughness. In another such embodiment the response of two or more segments are used to estimate the temperature of the powder.

In one embodiment of this invention a segmented field sensor has two or more sensing elements at two or more distances from a drive construct, such as a drive conductor, to sense different spatial segments of an applied field, such as a magnetic field or electric field. In one such embodiment an instrument measures the response at each sensing element simultaneously. In one such embodiment the instrument also measures the response at two or more drive input frequencies. In one such embodiment a model is used to precompute the responses for each sensing element and the database of precomputed responses is used to convert the two or more responses into two or more properties of interest. In one such embodiment the properties of interest are the proximity (liftoff) of the sensor relative to a material under test and a second property. In one such embodiment the second property is the magnetic permeability of a powder placed in a powder bed for the purpose of additive manufacturing. In one such embodiment the proximity is used to assess the surface condition of the powder locally for defects or globally for quality with a sufficient resolution to provide produce high quality parts. In one such embodiment the resolution is determined by the sensing element size and the data rate and the scan speed of the sensor relative to the powder bed. In one such embodiment the sensor includes a linear drive conductor and two or more rows of sensing elements in the form of small rectangles with leads for measuring the individual sensing element responses. In one such embodiment the number of sensing elements selected and the sensing element size is selected to be small enough to provide a signal to noise greater than 2:1 for local defects of interest and large enough to enable coverage of the desired powder bed surface width; and the data rate is fast enough to allow inspection of the entire desired length of the powder bed in less than the time it takes to process one layer using an additive manufacturing processing step such as binder fusion or laser sintering. In another such embodiment the sensing elements in the array are all measured simultaneously using a parallel architecture instrument. U.S. Pat. No. 10,324,062 issued Jun. 18, 2019 and incorporated by reference in its entirety describes parallel architecture instrumentation that may be used in some embodiments.

In one embodiment of this invention a model is used to represent a liftoff layer, a powder layer and a previously processed layer. In one such embodiment the scan of the previous processed layer, prior to placing the new powder layer is used to provide property estimates for the at least one previous processed layer. In one such embodiment the property estimates for the previous processed layer are used as input to a method for estimating the properties of the new powder layer including for detection of defects in the new layer. In one such embodiment, changes in the new layer property relative to the prior layer property are estimated. In another such embodiment the magnetic permeability of one or more new layers is estimated, given prior estimates of the magnetic permeability of prior deposited layers of powder. In one embodiment laser sintering is performed and the prior processed layer properties include an electrical conductivity and the magnetic permeability is assumed to be a function of the powder magnetic permeability. In another embodiment binder fusion is performed and the unknowns are the magnetic permeability of one or more new layers given the magnetic permeability of at least one prior layer within the depth of penetration of the fields.

In each of the above embodiments an electric field sensor can be used with a drive electrode and two or more sense electrodes at different distances from the drive electrode. In one such embodiment the two properties of interest are proximity and a second property such as permittivity or conductivity. In one such embodiment moisture content is measured. In one such embodiment density is measured. In another such embodiment, the real and imaginary parts of the complex permittivity are both estimated along with proximity using three sensing elements. In another such embodiment, the real and imaginary parts of the complex permittivity are both estimated using two sensing elements at different distances from the drive, with the proximity either controlled or measured using an independent method.

Figure 6:
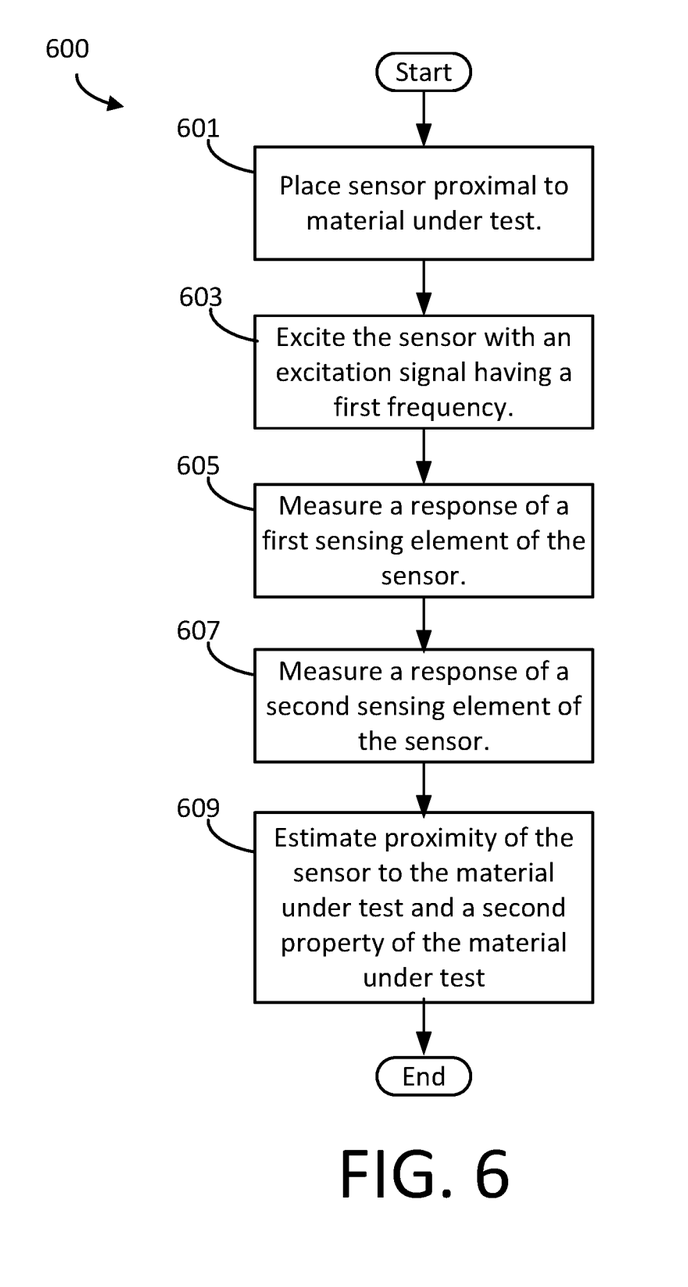
FIG. 6 is a flow diagram of a method for measuring properties of a material under test according to some embodiments.

Attention is now turned to method 600 shown in FIG. 6. Method 600 is a method of measuring material properties of a material under test. Method 600 may be implemented using system 100, or any suitable means.

At step 601, a segmented field sensor is placed proximal to the material under test. The segmented field sensor has a first sensing element at a first spatial wavelength and a second sensing element at a second spatial wavelength.

At step 603 the segmented field sensor is excited with an excitation signal having a first frequency.

At step 605 a first response of the first sense element due to the excitation signal is measured. The first response is a single scalar quantity. A scalar is a single numerical value. A complex number may be represented by a real and imaginary part and would not be considered a single scalar quantity (each of the real and imaginary part individually are single scalar quantities). Equivalently, a complex number may be represented as a magnitude and phase, each individually being scalar quantities, but together a complex number is not a single scalar quantity.

At step 607 a second response of the second sense element due to the excitation signal is measured.

At step 609 the proximity of the sensor to the material under test and a second property of the material under test is estimated from the first and second responses. The proximity and the second property of the material under test are estimated without any other substantially simultaneous response of the first sensing element due to the excitation signal at the first frequency that is independent of the first response. In some embodiments, the nature of the material under test with respect to the second property is such that although additional measurements could be made they do not provide additional, independent information that is useful for estimating the second property. Where measurement speed is not critical, or slower speeds are acceptable, additional measurements may be obtained from a single sensing element, for example, by intentionally changing the proximity of the sensor to the material under test.

Figure 5:
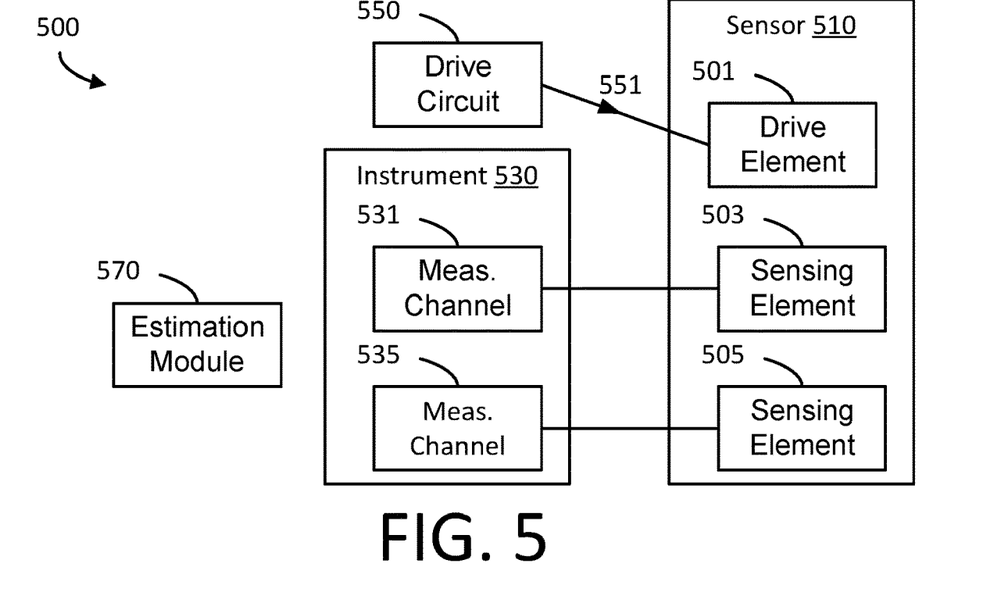
FIG. 5 is a block diagram of another inspection system according to some embodiments.

Attention is now turned to system 500 shown in FIG. 5. System 300 includes a segmented field sensor 510, a measurement instrument 530, a drive circuit 550, and an estimation module 570. Segmented field sensor 510 may have a drive element 501, a first sensing element 503 at a first spatial wavelength, and a second sensing element 505 at a second spatial wavelength. Drive circuit 550 has a signal generator that generates an excitation signal 551 having a first frequency. Drive circuit@ 350 is configured to connect to drive element 501 of segmented field sensor 510. Measurement instrument 530 has a first measurement channel 531 and a second measurement channel 533 configured to connect to the first and second sensing elements, respectively, of the segmented field sensor and to measure a first response and a second response of the elements, respectively, the first response being a single scalar quantity. Estimation module 570 is configured to estimate a proximity of the segmented field sensor to a material under test and a second property of the test object from the first and second responses and no other substantially simultaneous response of the first sensing element due to the excitation signal at the first frequency that is independent of the first response.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-discussed functions of these embodiments. As used herein, the term "computer-readable medium" encompasses only a computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, a RAM, a flash memory, or other type of computer memory), a magnetic disc or tape, an optical disc, and/or other types of computer-readable media that can be considered to be a machine or a manufacture.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical values appeared in this specification are deemed modified by a term of degree thereby reflecting their intrinsic uncertainty. The "substantially simultaneous response" means responses measured within 1 second of one another.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of measuring material properties, the method comprising acts of:
   placing a segmented field sensor proximal to a material under test, the material under test having a metal powder layer and a prior processed material, the segmented field sensor having a first sensing element at a first distance from a drive winding and a second sensing element at a second distance from the drive winding, the second distance different from the first distance;
   exciting the segmented field sensor with an excitation signal having a first frequency;
   first measuring a first response of the first sensing element due to the excitation signal, the first response being a single scalar quantity;
   second measuring a second response of the second sensing element due to the excitation signal; and
   estimating a proximity of the segmented field sensor to the material under test and a property of the metal powder layer of the material under test from the first and second responses and no other substantially simultaneous response of the first sensing element due to the excitation signal at the first frequency that is independent of the first response,
wherein a skin depth of an average particle within the metal powder layer at the first frequency is substantially larger than a largest dimension of the average particle.

2. The method of claim 1, wherein the segmented field sensor is a type of sensor selected from a group consisting of inductive loop sensor, magnetoresistive sensor, and magnetic field sensor.

3. The method of claim 1, wherein the single scalar quantity is selected from a group consisting of a real part of a transimpedance, an imaginary part of the transimpedance, a magnitude of the transimpedance, a phase of the transimpedance, a real part of a transadmittance, an imaginary part of the transadmittance, and a magnitude of the transadmittance, and a phase of the transadmittance.

4. The method of claim 1, wherein the property is an effective permeability of the metal powder layer.

5. The method of claim 4, wherein the method is part of an additive manufacturing process and the metal powder layer is a first metal powder layer, the method further comprising:
   processing at least a portion of the first metal powder layer;
   depositing a second metal powder layer on the first metal powder layer; and
   repeating the acts of exciting, first measuring, second measuring, and estimating with the first metal powder layer treated as part of the prior processed material having known properties and the repeated estimating determines an effective permeability of the second metal powder layer.

6. The method of claim 4, wherein the processing is a process selected from a group consisting of binder jet processing and laser sintering.

7. The method of claim 1, wherein the property of the metal powder layer estimated is a density of the metal powder layer.

8. The method of claim 1, further comprising estimating a surface roughness based at least in part on the proximity of the segmented field sensor to the material under test.

9. A system for characterizing a material under test, the material under test having a metal powder layer and a prior processed material, the system comprising:
    a segmented field sensor having a drive element, a first sensing element at a first distance from the drive element, and a second sensing element at a second distance from the drive element, the second distance different from the first distance;
    a drive circuit configured to generate an excitation signal having a first frequency and to connect to the drive element of the segmented field sensor;
    an instrument with first and second measurement channels configured to connect to the first and second sensing elements, respectively, of the segmented field sensor and to measure a first response and a second response of the first and second sensing elements, respectively, the first response being a single scalar quantity; and
    an estimation module configured to estimate a proximity of the segmented field sensor to the material under test and a property of the metal powder layer from the first and second responses and no other substantially simultaneous response of the first sensing element due to the excitation signal at the first frequency that is independent of the first response,
wherein a skin depth of an average particle within the metal powder layer at the first frequency is substantially larger than a largest dimension of the average particle.

10. The system of claim 9, wherein the segmented field sensor is a type of sensor selected from a group consisting of inductive loop sensor, magnetoresistive sensor, and magnetic field sensor.

11. The system of claim 9, wherein the first measurement channel is configured to measure a real part and an imaginary part of a transimpedance of the first sensing element, and the first response is computed from the real part and the imaginary part of the transimpedance.

12. The system of claim 11, wherein the first response is the real part of the transimpedance.

13. The system of claim 11, wherein the first response is a magnitude of the transimpedance computed from the real part and the imaginary part of the transimpedance.

14. The system of claim 9 further comprising: a storage module for storing a database for mapping sensor responses to proximity and a second property, and wherein the estimation module is configured to process the first and second responses through the database to estimate the proximity and the second property.

15. The system of claim 9, wherein the material under test comprises a first layer and a background material, the system further comprising a storage module to store stored properties of the background material, and wherein the estimation module is configured to additionally use the stored properties to estimate the proximity and the second property, the second property being a property of the first layer.

16. The system of claim 9, wherein the segmented field sensor is selected from a group consisting of a circular geometry segmented field sensor and a cartesian geometry segmented field sensor.

17. A method of measuring material properties, the method comprising acts of:
    providing a material under test comprising a powder layer and a prior processed material;
    placing a segmented field sensor proximal to the material under test, the segmented field sensor having a first sensing element at a first distance from a drive winding and a second sensing element at a second distance from the drive winding, the second distance different from the first distance;
    exciting the segmented field sensor with an excitation signal having a first frequency;
    measuring a first response of the first sensing element due to the excitation signal, the first response having a phase with a phase shift of less than 5 degrees relative to a response to the prior processed material alone;
    measuring a second response of the second sensing element due to the excitation signal; and
    estimating a proximity and a property of the material under test from the first and second responses,
wherein a skin depth of an average particle within the powder layer at the first frequency is substantially larger than a largest dimension of the average particle.

18. The method of claim 17, wherein the segmented field sensor is a type of sensor selected from a group consisting of inductive loop sensor, magnetoresistive sensor, and magnetic field sensor.

19. The method of claim 17, wherein the estimating of the proximity and the property uses a parameter proportional to a magnitude of the first response and the estimating is independent of the phase of the first response.

20. The method of claim 17, wherein the estimating of the proximity and the property, the first and second responses are scalar quantities.

21. The method of claim 17, wherein the property is surface roughness.

22. The method of claim 17, further comprising an act of identifying from the property a defect in the material under test.

23. The method of claim 17, wherein the powder layer is a metal powder layer and the property is an effective permeability of the metal powder layer.

24. The method of claim 1, wherein the skin depth of the average particle within the metal powder layer at the first frequency is more than four times the largest dimension of the average particle.

25. The system of claim 9, wherein the skin depth of the average particle within the metal powder layer at the first frequency is more than four times the largest dimension of the average particle.

26. The method of claim 17, wherein the skin depth of the average particle within the powder layer at the first frequency is more than four times the largest dimension of the average particle.

* * * * *